United States Patent
Desai et al.

(10) Patent No.: US 10,044,719 B2
(45) Date of Patent: Aug. 7, 2018

(54) CLIENT APPLICATION BASED ACCESS CONTROL IN CLOUD SECURITY SYSTEMS FOR MOBILE DEVICES

(71) Applicants: Purvi Desai, Cupertino, CA (US); Abhinav Bansal, San Jose, CA (US)

(72) Inventors: Purvi Desai, Cupertino, CA (US); Abhinav Bansal, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 90 days.

(21) Appl. No.: 15/009,966

(22) Filed: Jan. 29, 2016

(65) Prior Publication Data

US 2017/0223024 A1    Aug. 3, 2017

(51) Int. Cl.
*H04L 29/06* (2006.01)
*H04L 29/08* (2006.01)

(52) U.S. Cl.
CPC .......... *H04L 63/101* (2013.01); *H04L 63/029* (2013.01); *H04L 63/0281* (2013.01); *H04L 63/1433* (2013.01); *H04L 63/20* (2013.01); *H04L 67/10* (2013.01); *H04L 67/2814* (2013.01); *H04L 67/02* (2013.01)

(58) Field of Classification Search
CPC .................................................... H04L 63/101
USPC ............................................................ 726/1
See application file for complete search history.

(56) References Cited

U.S. PATENT DOCUMENTS

| | | | |
|---|---|---|---|
| 7,725,925 B2 | 5/2010 | Lui et al. | |
| 8,082,580 B1 | 12/2011 | Desai et al. | |
| 8,499,331 B1 | 7/2013 | Yehuda et al. | |
| 8,510,551 B1 | 8/2013 | Desai et al. | |
| 8,806,593 B1 | 8/2014 | Raphel et al. | |
| 8,869,259 B1 | 10/2014 | Udupa et al. | |
| 8,886,925 B2* | 11/2014 | Qureshi | H04L 63/20 713/150 |
| 9,060,239 B1 | 6/2015 | Sinha et al. | |
| 9,118,689 B1 | 8/2015 | Apte et al. | |
| 9,787,686 B2* | 10/2017 | Stuntebeck | H04L 63/102 |
| 2005/0086328 A1 | 4/2005 | Landram et al. | |
| 2007/0195779 A1 | 8/2007 | Judge et al. | |
| 2007/0234426 A1 | 10/2007 | Khanolkar et al. | |
| 2009/0036111 A1 | 2/2009 | Danford et al. | |
| 2009/0178131 A1 | 7/2009 | Hudis et al. | |
| 2009/0178132 A1 | 7/2009 | Hudis et al. | |

(Continued)

FOREIGN PATENT DOCUMENTS

| | | |
|---|---|---|
| WO | 03084201 A1 | 10/2003 |
| WO | 2010059893 A1 | 5/2010 |

*Primary Examiner* — Christopher J Brown
(74) *Attorney, Agent, or Firm* — Clements Bernard Walker PLLC; Lawrence A. Baratta, Jr.

(57) ABSTRACT

Systems and methods, implemented by one or more nodes in a cloud-based security system, for enforcing application-based control of network resources include receiving a request from a user device for the network resources; evaluating the request through the cloud-based security system and determining an application on the user device performing the request; and performing one of (1) denying the request if the application is unauthorized to access the network resources, (2) redirecting the request to an authorized application on the user device if the application is legitimate but unauthorized to access the network resources, and (3) allowing the request if the application is authorized to access the network resources.

18 Claims, 7 Drawing Sheets

(56) References Cited

U.S. PATENT DOCUMENTS

| | | |
|---|---|---|
| 2010/0080383 A1 | 4/2010 | Vaughan et al. |
| 2010/0125897 A1 | 5/2010 | Jain et al. |
| 2010/0125903 A1 | 5/2010 | Devarajan et al. |
| 2010/0293610 A1 | 11/2010 | Beachem et al. |
| 2010/0333177 A1 | 12/2010 | Donley et al. |
| 2011/0131275 A1 | 6/2011 | Maida-Smith et al. |
| 2011/0137905 A1 | 6/2011 | Good et al. |
| 2012/0179802 A1 | 7/2012 | Narasimhan et al. |
| 2012/0215898 A1 | 8/2012 | Shah et al. |
| 2014/0020062 A1 | 1/2014 | Tumula et al. |
| 2014/0068273 A1* | 3/2014 | Sobel .................... G06F 21/604 713/189 |
| 2016/0373251 A1* | 12/2016 | Kumar ...................... H04L 9/08 |

* cited by examiner

CLIENT APPLICATION BASED ACCESS CONTROL IN CLOUD SECURITY SYSTEMS FOR MOBILE DEVICES

FIELD OF THE DISCLOSURE

The present disclosure generally relates to computer networking systems and methods. More particularly, the present disclosure relates to client application control systems and methods in cloud-based security systems for mobile devices.

BACKGROUND OF THE DISCLOSURE

There is a staggering growth of endpoint mobile devices and cloud services in enterprises. With this influx, Information Technology (IT) administrators can no longer ignore these devices as simply outside their scope of responsibility. Access to sensitive corporate resources has been traditionally limited by role-based access controls implemented through on-premise Virtual Private Networks (VPNs) where any user with appropriate rights can access corporate resources using any application. In role-based access controls, users are categorized into groups and resource access is evaluated by the permissions on that group. Resource access is then a function of the permissions on the user group only and not on the ways that the user employs to access that resource. Historically, the number of ways a user can access data had been severely limited due to scarcity of such applications and the level of control that the IT admin had over lockdown on premise desktop systems where users had limited privileges to install or remove software.

With the advent of cloud, mobility, and BYOD (bring your own devices), there has been a growth in mobile applications that affords the end user with a variety of choices in accessing corporate resources such as third party browsers, mail-clients, file sharing apps, etc. This poses severe security risks where a user inadvertently may use a malicious application to access sensitive corporate information. A malicious application, for example, may then use such corporate information in nefarious ways such as by caching or transmitting data over network to a server. In the past, an antivirus was used to black/white list applications and to remove such software from the system, however this fails to capture the correspondence between the nature of resource and the application requesting the resource. For instance, a user may continue to use any browser for private Internet access but must use a secure web browser that conforms to enterprise security policies to access internal corporate resources.

In conventional, non-mobile environments, IT admins have full control over the systems which are totally lockdown to prevent installation of illegitimate software or removal of legitimate ones. However, with the changing landscape, end users have sufficient control to access corporate resources from any application, device, network, or geography with a VPN application. Such risks can be avoided with proper access control restrictions on the applications that a user can use to access network resources.

BRIEF SUMMARY OF THE DISCLOSURE

In an exemplary embodiment, a method, implemented by one or more nodes in a cloud-based security system, for enforcing application-based control of network resources includes receiving a request from a user device for the network resources; evaluating the request through the cloud-based security system and determining an application on the user device performing the request; and performing one of denying the request if the application is unauthorized to access the network resources, redirecting the request to an authorized application on the user device if the application is legitimate but unauthorized to access the network resources, and allowing the request if the application is authorized to access the network resources.

In another exemplary embodiment, a node in a cloud-based security system configured to enforce application-based control of network resources includes a network interface, a data store, and a processor communicatively coupled to one another; and memory storing computer executable instructions, and in response to execution by the processor, the computer-executable instructions cause the processor to receive a request from a user device for the network resources, evaluate the request through the cloud-based security system and determine an application on the user device performing the request, and perform one of deny the request if the application is unauthorized to access the network resources, redirect the request to an authorized application on the user device if the application is legitimate but unauthorized to access the network resources, and allow the request if the application is authorized to access the network resources.

In a further exemplary embodiment, a user device configured to access a cloud-based security system which performs application-based control of network resources includes a network interface, a data store, and a processor communicatively coupled to one another; and memory storing computer executable instructions, and in response to execution by the processor, the computer-executable instructions cause the processor to provide a request the network resources through an application, responsive to evaluation of the request through the cloud-based security system, perform one of receive a denial of the request if the application is unauthorized to access the network resources, cause redirection of the request to an authorized application by the cloud-based security system if the application is legitimate but unauthorized to access the network resources, and receive a response to the request if the application is authorized to access the network resources.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to client application control systems and methods in cloud-based -security systems for user devices, including mobile devices. To overcome the limitations described above, the systems and methods introduce the concept of "application-based access control" whereby access to sensitive network resources is limited by the nature of the application being used. Using a cloud based security system, uncontrolled access to network resources can be restricted through application-based access controls. This can also extend role-based access controls from users to applications. With a cloud-based security system in place, the IT admin can impose application-level access control where access to certain network resources is not allowed from blacklisted applications or allowed only using a specific whitelisted application that conforms to the security standards of the enterprise.

The systems and methods address the unmanageable growth of mobility, BYOD devices, etc. and the associated proliferation of mobile applications that pose major risks to conventional security systems and models. Cloud-based security systems not only secure data in transit but also makes imperative that all network data is accessed through legitimate secure applications and prevent the possibility of any network resource access through third party applications which offer critical risk to the security of the enterprise. This further allows end users to use applications of their choice for accessing non-critical corporate resources, thus catering to the BYOD use case.

§ 1.0 Example High-Level System Architecture—Cloud-Based Security System

Figure 1:
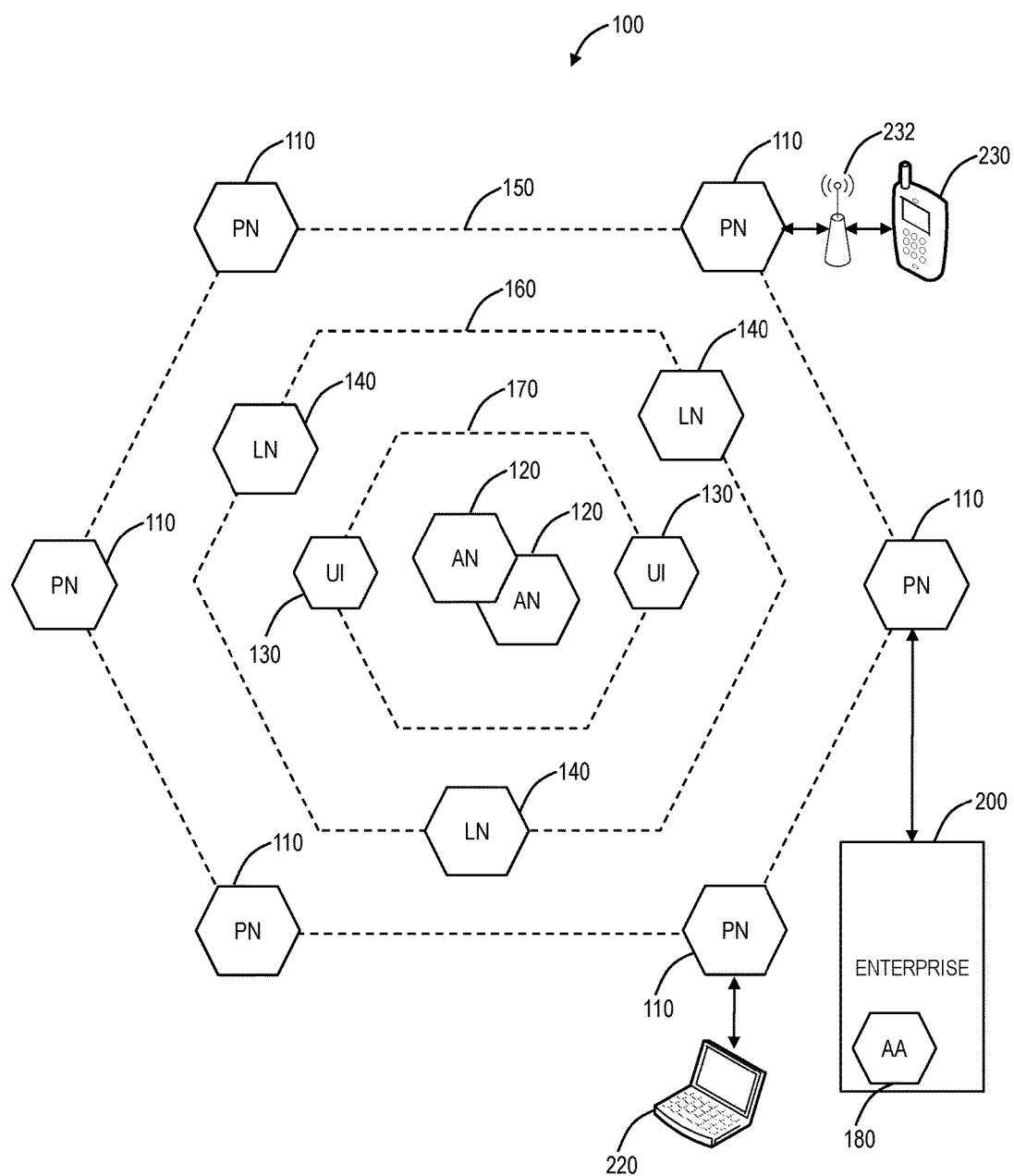
FIG. 1 is a network diagram of a distributed security system.

Referring to FIG. 1, in an exemplary embodiment, a block diagram illustrates a distributed security system 100. The system 100 may, for example, be implemented as an overlay network in a wide area network (WAN), such as the Internet, a local area network (LAN), or the like. The system 100 includes processing nodes (PN) 110, that proactively detect and preclude the distribution of security threats, e.g., malware, spyware, viruses, email spam, Data Leakage Prevention (DLP), content filtering, etc., and other undesirable content sent from or requested by an external system. The processing nodes 110 can also log activity and enforce policies, including logging changes to the various components and settings in the system 100. Example external systems may include an enterprise or external system 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories, e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, . . . , cm] of the content item, at any of the processing nodes 110, any one of the data inspection engines generates an output that results in a classification of "violating."

Figure 3:
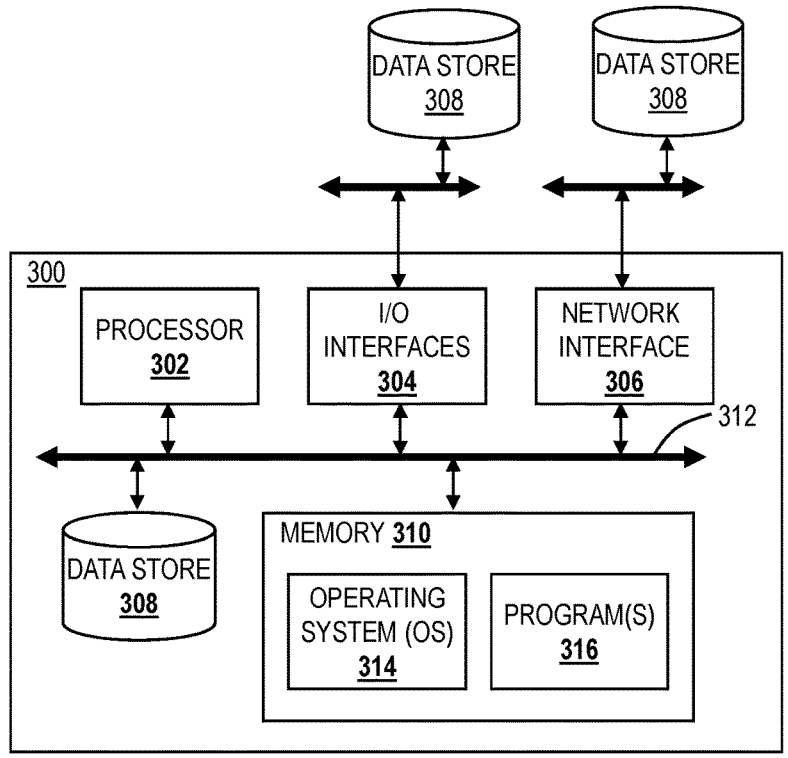
FIG. 3 is a block diagram of a server which may be used in the distributed security system of FIG. 1 or with any other cloud-based system.

Each of the processing nodes 110 may be implemented by one or more of computer and communications devices, e.g., server computers, gateways, switches, etc., such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the processing nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may be implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other Internet Protocol (IP) security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Generally, the distributed security system 100 may generally refer to an exemplary cloud-based security system. Other cloud-based security systems and generalized cloud-based systems are contemplated for the systems and methods for tracking and auditing changes in a multi-tenant cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security system 100 is illustrated herein as one exemplary embodiment of a cloud-based system, and those of ordinary skill in the art will recognize the tracking and auditing systems and methods contemplate operation on any cloud-based system.

§ 2.0 Example Detailed System Architecture and Operation

Figure 2:
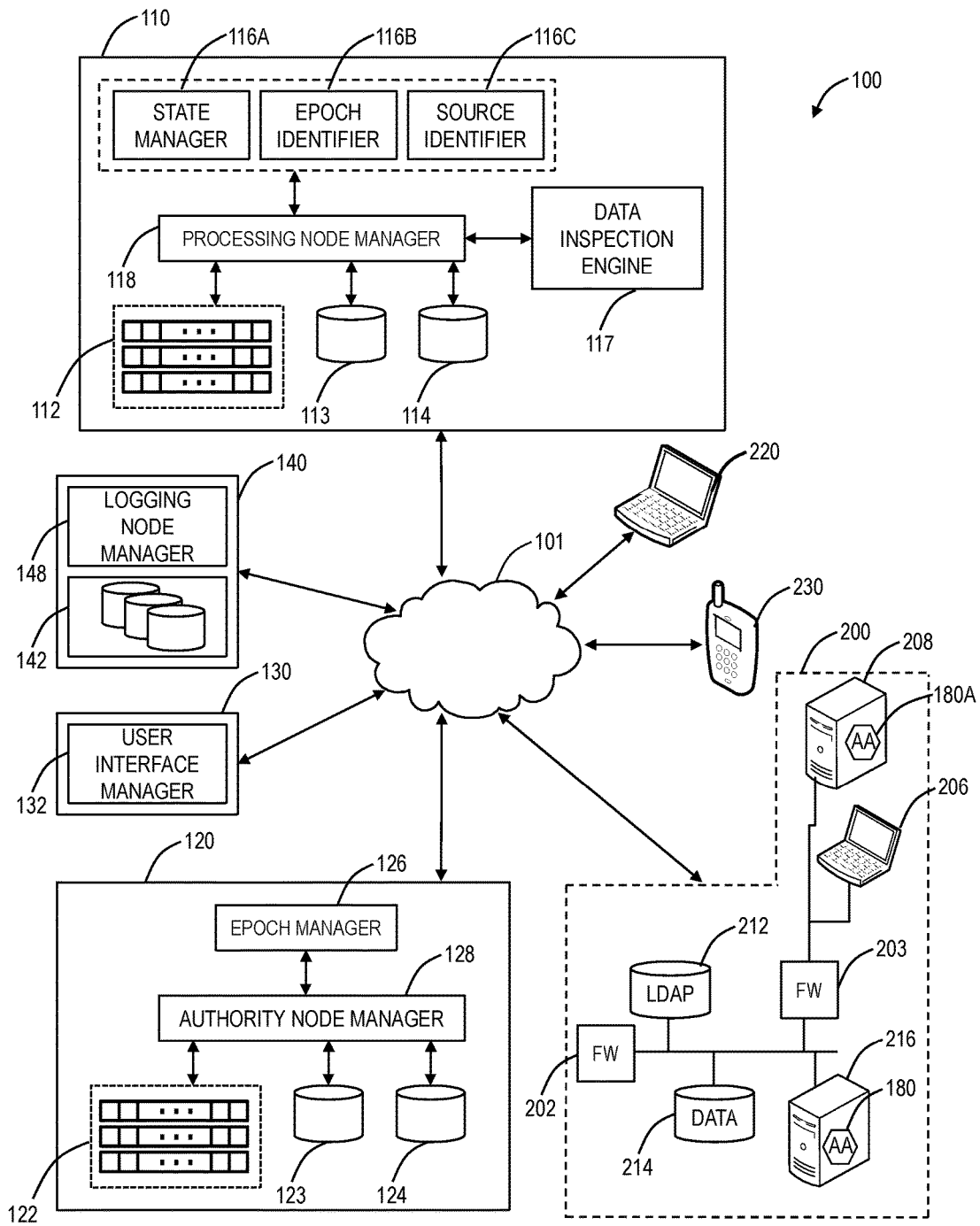
FIG. 2 is a network diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 to one another. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180*a* may be included on a client computer 206. The client access agent 180*a* may, for example, facilitate security processing by providing a hash index of files on the user computer 206 to a processing node 110 for malware, virus detection, etc. Other security operations may also be facilitated by the access agent 180*a*. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180*b*. The computer device 220 and the mobile device 230 may also store information warranting security measures, such as personal bank records, medical information, and login information, e.g., login information to the computers 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

§ 2.1 Example Processing Node Architecture

In an exemplary embodiment, the processing nodes 110 are external to network edges of the external systems 200, 220 and 230. Each of the processing nodes 110 stores security policy data 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to validate further the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

§ 2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 120.

§ 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 113 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer readable medium. Other processing architectures can also be used, e.g., a combination of specially designed hardware and software, for example.

§ 3.0 Exemplary Server Architecture

Referring to FIG. 3, in an exemplary embodiment, a block diagram illustrates a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate over a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 Exemplary Mobile Device Architecture

Figure 4:
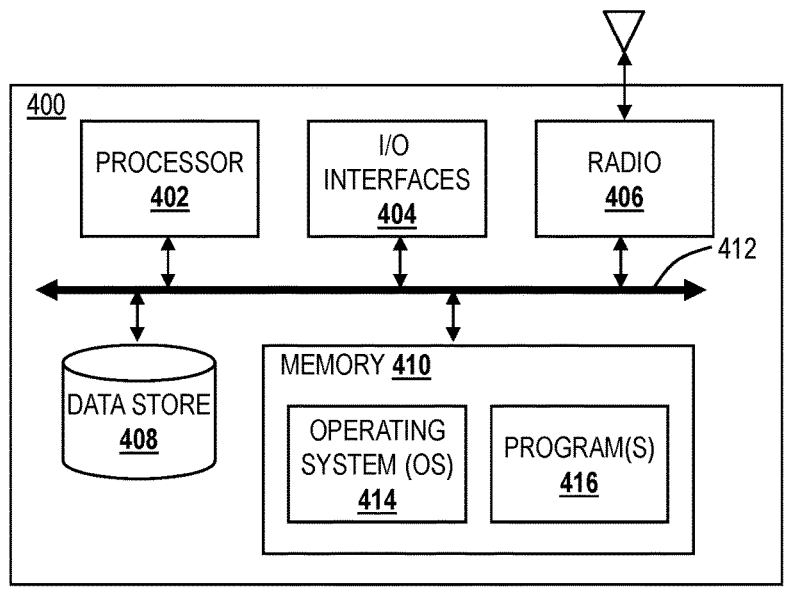
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an exemplary embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§ 5.0 Exemplary General Cloud System

Figure 5:
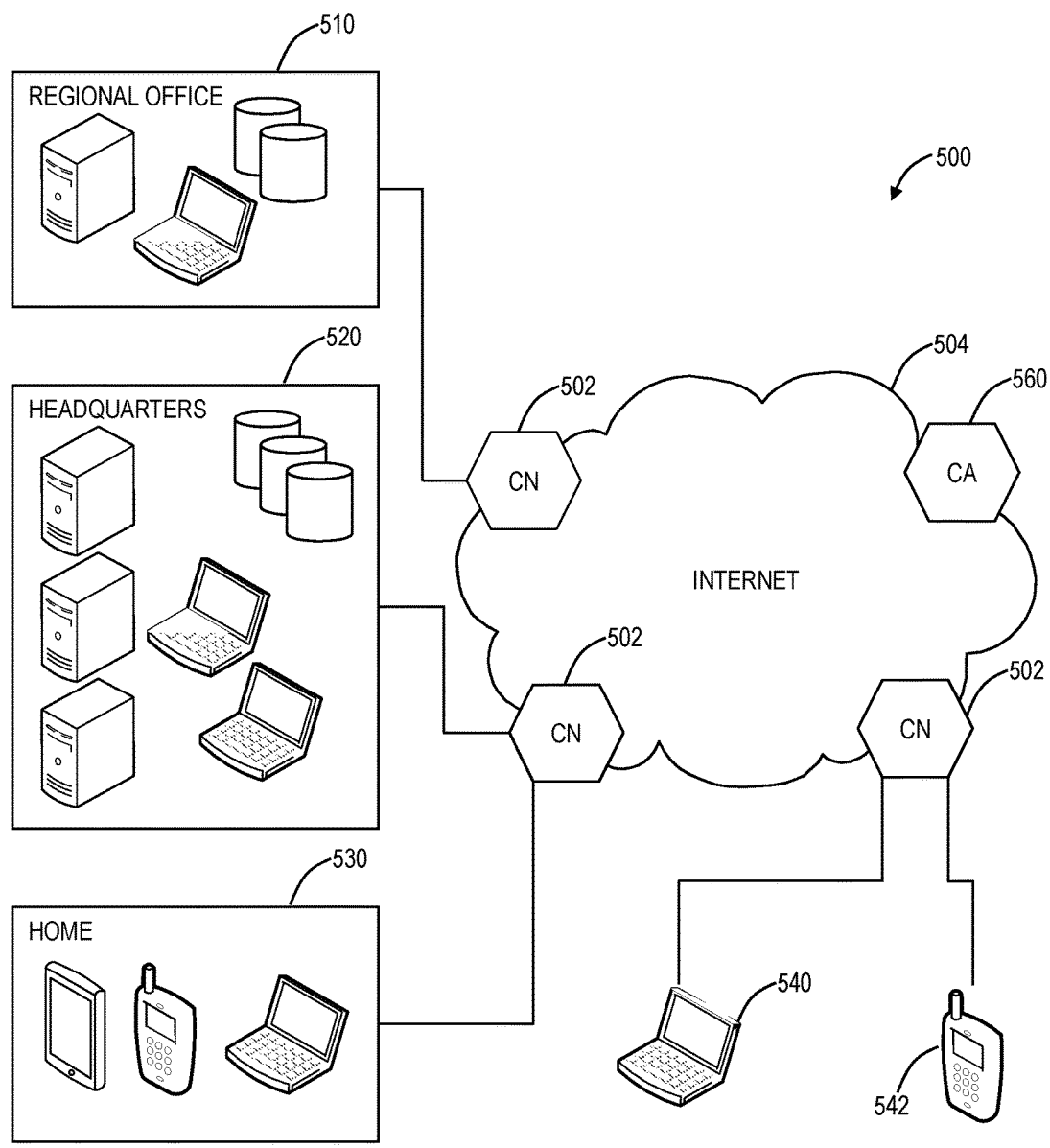
FIG. 5 is a network diagram of a generalized cloud-based system.

Referring to FIG. 5, in an exemplary embodiment, a cloud system 500 is illustrated for implementing the systems and methods described herein for tracking and auditing changes in a multi-tenant cloud system. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud0based system, such as a system providing different functionality from security. In the cloud system 500, traffic from various locations (and various devices located therein) such as a regional office 510, headquarters 520, various employee's homes 530, mobile laptop 540, and mobile device 542 communicates to the cloud through the cloud nodes 502. That is; each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero-day vulnerability protection, web 2.0 features, and the like. In an exemplary embodiment, the cloud system 500 and the distributed security system 100 may be viewed as Security-as-a-Service through the cloud. In general, the cloud system 500 can be configured to perform any function in a multi-tenant environment. For example, the cloud system 500 can provide content, a collaboration between users, storage, application hosting, and the like.

In an exemplary embodiment, the cloud system 500 can utilize the systems and methods for tracking and auditing changes in a multi-tenant cloud system. That is, the cloud system 500 can track and audit administrator activity associated with the cloud system 500 in a segregated and overlaid fashion from the application functions performed by the cloud system 500. This segregated and overlaid fashion decouples the tracking and auditing from application logic, maximizing resources and minimizing development complexity and runtime processing. The cloud system 500 (and the system 100) can be offloaded from complex tracking and auditing functions so that it can provide its primary function. In the context of a distributed security system, the tracking and auditing systems and methods enable accountability, intrusion detection, problem diagnosis, and data reconstruction, all in an optimized fashion considering the exponential growth in cloud-based systems.

§ 6.0 DNS Augmented Security

In an exemplary embodiment, the cloud system 500 and/or the distributed security system 100 can be used to perform DNS surrogation. Specifically, DNS surrogation can be a framework for distributed or cloud-based security/monitoring as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security system 100 and the cloud-based system 500 is performed in an in-line manner, i.e. the processing nodes 110 and the cloud nodes 502 are in the data path of connecting users. Another approach can include a passive approach to the data path. DNS is one of the most fundamental IP protocols. With DNS surrogation as a technique, it is proposed to use DNS for dynamic routing of traffic, per user authentication and policy enforcement, and the like.

In conjunction with the cloud system 500 and/or the distributed security system 100, various techniques can be used for monitoring which are described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Exemplary high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Figure 6:
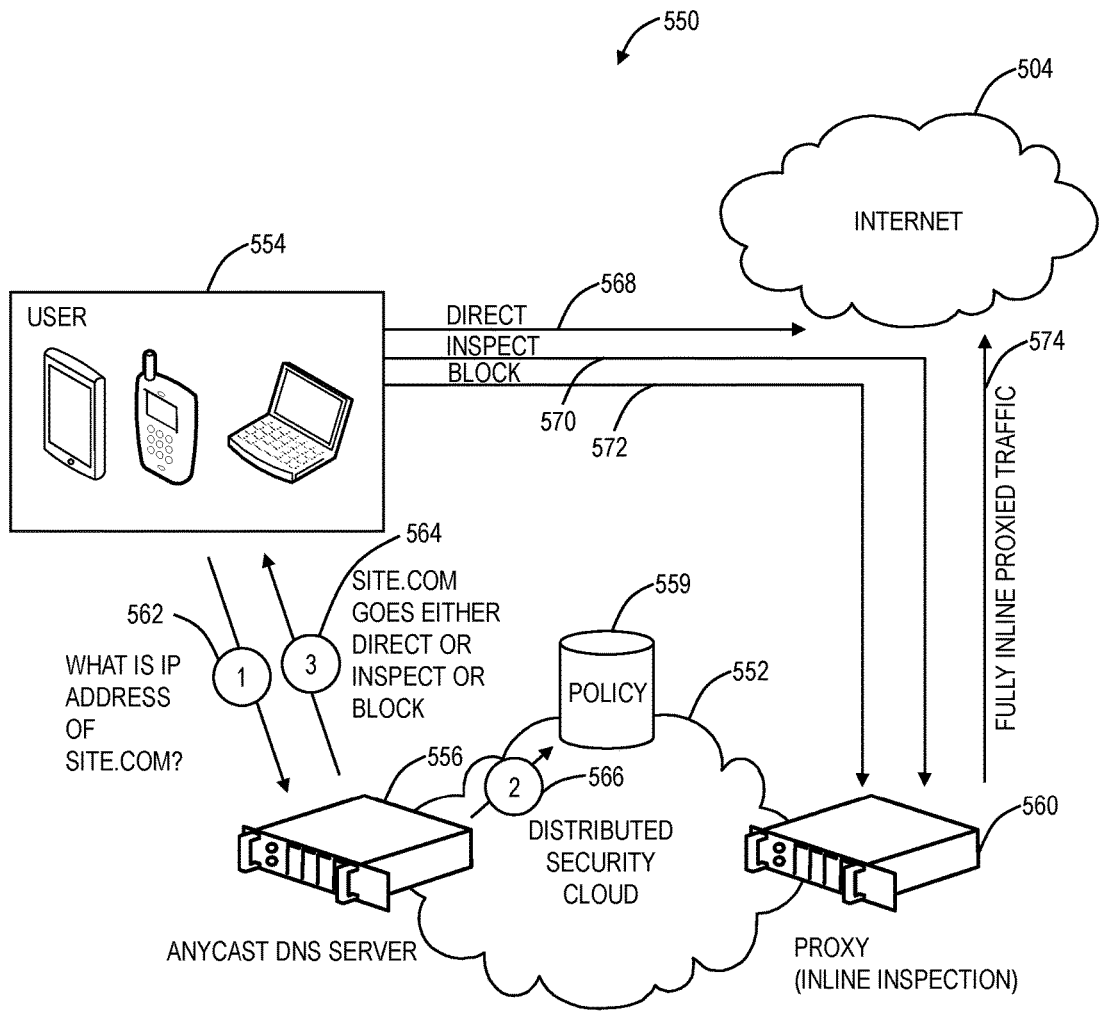
FIG. 6 is a network diagram of a network with a distributed security cloud providing DNS augmented security.

Referring to FIG. 6, in an exemplary embodiment, a network diagram illustrates a network 550 with a distributed security cloud 552 providing DNS augmented security. The network 550 includes a user device 554 connecting to the distributed security cloud 552 via an anycast DNS server 556. The anycast DNS server 556 can be a server such as the server 300 of FIG. 3. Also, the anycast DNS server 556 can be the processing node 110, the cloud node 502, etc. The distributed security cloud 552 includes the anycast DNS server 556, policy data 558, and an inline proxy 560. The inline proxy 560 can include the processing node 110, the cloud node 502, etc. In operation, the user device 554 is configured with a DNS entry of the anycast DNS server 556, and the anycast DNS server 556 can perform DNS surrogation as is described herein. The distributed security cloud 552 utilizes the anycast DNS server 556, the policy data 558, and the inline proxy 560 to perform the DNS augmented security.

The network 550 illustrates the DNS augmented security where DNS information is used as follows. First, at step 562, the user device 554 requests a DNS lookup of a site, e.g. "what is the IP address of site.com?" from the anycast DNS server 556. The anycast DNS server 556 accesses the policy data 558 to determine the policy associated with the site at step 564. The anycast DNS server 556 returns the IP address of the site based on the appropriate policy at step 566. The policy data 558 determines if the site either goes direct (step 568) to the Internet, is inspected by the inline proxy (step 570), or is blocked per policy (step 572). Here, the anycast DNS server 556 returns the IP address with additional information if the site is inspected or blocked. For example, if the anycast DNS server 556 determines the access is direct, the anycast DNS server 556 simply returns the IP address of the site. If the anycast DNS server 556 determines the site is blocked or inspected, the anycast DNS server 556 returns the IP address to the inline proxy 560 with additional information. The inline proxy 560 can block the site or provide fully in line proxied traffic to the site (step 574) after performing monitoring for security.

The DNS augmented security advantageously is protocol and application agnostic providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/black list enforcement, etc. for enhanced security without content filtering. In this manner, the network 550 can be used with the distributed security system 100 and the cloud system 500 to provide cloud-based security without requiring full inline connectivity.

§ 7.0 Cloud-based Security System Application-based Control

Figure 7:
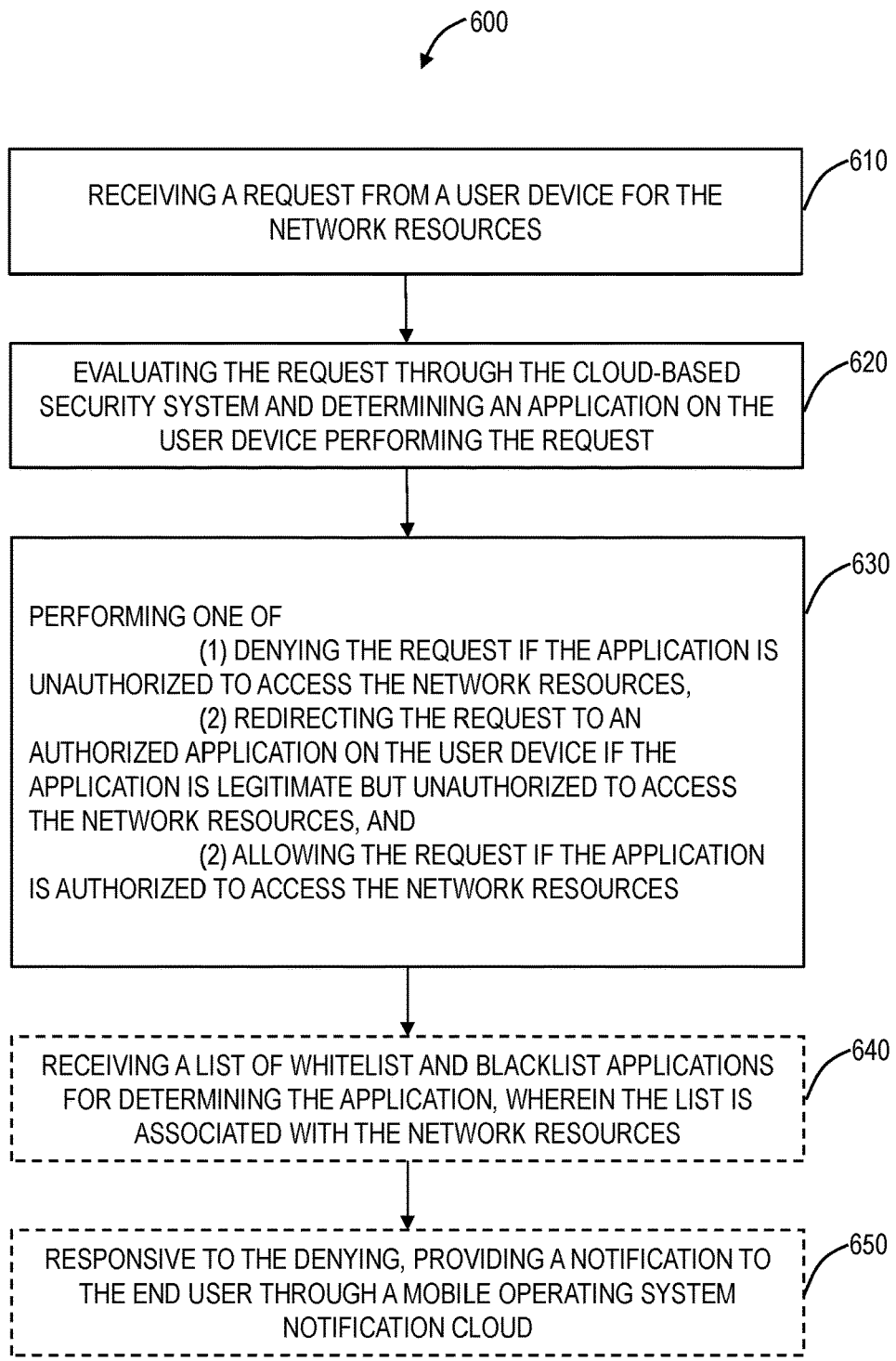
FIG. 7 is a flowchart of a process, implemented by one or more nodes in a cloud-based security system, such as the distributed security system of FIG. 1 or the cloud system of FIG. 5, for enforcing application-based control of network resources.

Referring to FIG. 7, in an exemplary embodiment, a flowchart illustrates a process 600, implemented by one or more nodes in a cloud-based security system, such as the distributed security system 100 or the cloud system 500, for enforcing application-based control of network resources. The process 600 provides "application-based access control" whereby access to sensitive network resources is limited by the nature of the application being used. Using the cloud-based security system, uncontrolled access to network resources can be restricted through application-based access controls using the process 600. This can also extend role-based access controls from users to applications. With a cloud-based security system in place, the IT admin can impose application-level access control where access to certain network resources is not allowed from blacklisted applications or allowed only using a specific whitelisted application that conforms to the security standards of the enterprise.

The process 600 includes receiving a request from a user device for the network resources (step 610); evaluating the request through the cloud-based security system and determining an application on the user device performing the request (step 620; and performing one of (1) denying the request if the application is unauthorized to access the network resources, (2) redirecting the request to an authorized application on the user device if the application is legitimate but unauthorized to access the network resources, and (3) allowing the request if the application is authorized to access the network resources (step 630). Optionally, the process 600 includes receiving a list of whitelist (authorized) and blacklist (unauthorized) applications for determining the application, wherein the list is associated with the network resources (step 640). The process 600 can also include, responsive to the denying, providing a notification to the end user through a mobile Operating System notification cloud (step 650).

The mobile Operating System notification cloud can include servers provided by a mobile OS platform such as Apple Push Notification Service (APNS), Google Cloud Messaging (GCM) for Android, and Windows Push Notification Service (WPNS). The notification cloud can also include an out-of-band notification such as described in commonly assigned, co-pending U.S. patent application Ser. No. 14/461,790 filed Aug. 18, 2014, and entitled "OUT OF BAND END USER NOTIFICATION SYSTEMS AND METHODS FOR SECURITY EVENTS RELATED TO NON-BROWSER MOBILE APPLICATIONS," the contents of which are incorporated by reference herein.

The network resources can be in an enterprise network, the user device can be a mobile device, and the mobile device can be configured to communicate with the enterprise network through the cloud-based security system. The enterprise network and the mobile device can be both located external to the cloud-based security system, and the enterprise network and the mobile device can be both located external to one another. The user device can be connected to the cloud-based security system through a tunnel, and the evaluating can be based on a tunnel protocol used. The network resources can be connected to the cloud-based security system through a tunnel, and wherein the evaluating is based on a tunnel protocol used. The redirecting can include causing the authorized application to intercept a redirect request, causing a tunnel between the user device and a network associated with the network resources, and enabling the exchange of the network resources to the authorized application via the tunnel. The application can include an email client, and the network resources can include email on a corporate network. The application can include a Web browser, and the network resources can include data files or content on a corporate network.

The process 600 can include network access controlled through a tunnel to the cloud-based security system. The cloud-based security system performs an evaluation of the network resource being requested depending upon the tunnel protocol. The cloud-based security system can inspect the application that is requesting the resource and generate a deny decision if the resource requested does not originate from the application that is allowed to access the resource. If the application is legitimate but if the requested resource is inaccessible from the outside network, the cloud-based security system can send a redirect to the authorized application with the resource identifier of the original request. The authorized application can then intercept the redirect request, authenticate the requesting user, perform conventional access control measures, tunnel the request to the VPN concentrator and respond back with the requested data. The cloud-based security system can further perform deep application identification from the requests to classify apps for work and for personal use, thereby allowing users to isolate personal and corporate workspaces catering to the BYOD use case.

In an exemplary embodiment, the end user device has a client application installed that forwards all network traffic to a cloud-based security system. This can be achieved through a lightweight custom tunnel, a traditional proxy, or Internet Protocol Security (IPSec) based VPN approaches. Tunnel establishment is achieved only after proper user authentication. In an exemplary embodiment, the lightweight custom tunnel can be as described in commonly assigned, co-pending U.S. patent application Ser. No. 14/560,609 filed Dec. 4, 2014, and entitled "SECURE AND LIGHTWEIGHT TRAFFIC FORWARDING SYSTEMS AND METHODS TO CLOUD BASED NETWORK SECURITY SYSTEMS," the contents of which are incorporated by reference herein. In another exemplary clientless deployment, the end user device is connected to a corporate network which is configured to a cloud-based security system using a GRE tunnel.

A first approach to application-based access control can include an In-Channel Server Redirect to Application with the tunnel as one of a proxy, IPSec VPN, and GRE tunnel. Another approach to application-based access control can include an in-channel client redirect to the application from the tunnel to the cloud-based security system.

Figure 8:
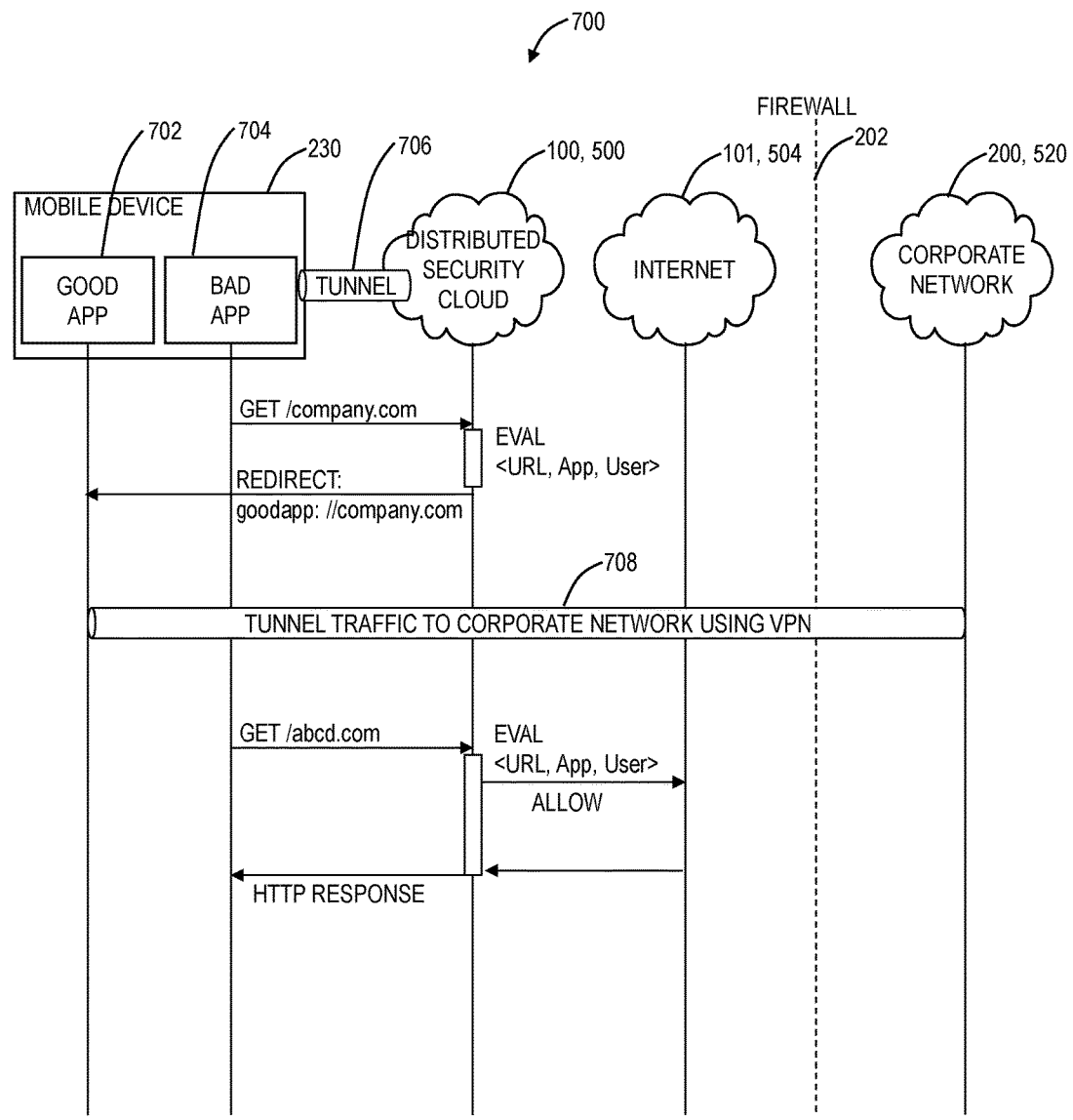
FIG. 8 is a flow diagram illustrates exemplary workflow in the cloud-based security system for application-based control.

§ 8.0 Exemplary Workflow for Cloud-based Security System Application-based Control Referring to FIG. 8, in an exemplary embodiment, a flow diagram illustrates exemplary workflow 700 in the cloud-based security system for application-based control. For an administer, the exemplary workflow can include:

(1) The admin logs into a portal for the cloud-based security system, such as through the UI 130, (2) the admin configures applications (e.g., whitelist, blacklist) and their custom URL schemes, (3) the admin configures URL policies and ties them to applications, and (4) the admin configures the user device to follow a tunnel/proxy/VPN through any possible solutions such as endpoint client app or a GRE tunnel to the cloud-based security system on the enterprise router. The URL policies can include, for example, (a) BLOCK access if URL matches *.abc.com AND Application matches "Tor Browser," (b) REDIRECT to Application "SafeBrowser" if URL matches "*.company.com," (c) REDIRECT to Application "BOX" if URL contains "data.company.com," (d) BLOCK all from Application "Facebook," (e) CAUTION if URL matches *.company.com AND Application does not match "SafeBrowser,: (f) DEFAULT: ALLOW All.

The exemplary workflow 700 includes the mobile device 230 with good apps 702 and bad apps 704 connected to the cloud-based security system 100, 500 via a tunnel 706, for example. The mobile device 230 is configured to request network resources in the corporate network 200, 520, via the cloud-based security system 100, 500 through the Internet 101, 504. The mobile device 230 is configured to connect to the cloud-based security system 100, 500 a using proxy/VPN, and the mobile device 230 authenticates with the cloud-based security system 100, 500. After successful authorization, device traffic flows between the mobile device 230 and the Internet 101, 504 via the cloud-based security system 100, 500.

The mobile device 230 can issue a request to access a resource in the corporate network 200, 520, for example, from one of the apps 702, 704. The request reaches the tunnel 706, which processes and evaluates the requested resource URL from the REQUEST HEADER and the app 702, 704 generating the request from the USER-AGENT of the REQUEST HEADER. The tunnel 706 can evaluate the processing rules configured by the admin through the cloud-based security system 100, 500 and generate a decision to ALLOW/BLOCK/CAUTION/REDIRECT depending upon the input <URL resource, Client Application, User-Id>.

Depending upon the protocol, the cloud-based security system 100, 500 will generate an appropriate response, e.g., for a BLOCK rule, and HTTP protocol, the cloud-based security system 100, 500 will respond with a 403 HTTP code. Similarly, for a REDIRECT rule and HTTP protocol, the cloud-based security system 100, 500 will respond with a 307 HTTP code with a location header pointing to the custom URL of the application being redirected to such as: safebrowser://<url-to-open>.

Equivalently for HTTPS protocol, depending upon the enterprise policies for secure traffic, the cloud-based security system 100, 500 will inspect the CONNECT HEADER to fetch the URL and the client application. For instance: inspecting "CONNECT secure.eicar.org:443 HTTP/1.1\r\n" will give secure.eicar.org as the requested resource. Further, depending upon the evaluation of <requested URL, Application in context and the User>, the cloud-based security system 100, 500 will perform the SSL handshake on the behalf of the server and generate a corresponding ALLOW/BLOCK/CAUTION/REDIRECT HTTP response.

For example, in FIG. 8, the bad app 704 can send a request (GET /company.com) over the tunnel 706 which the cloud-based security system 100, 500 evaluates (EVAL <URL, App, User>) and determines a redirect (REDIRECT goodapp//compay.com) including setting up a tunnel 708 to the corporate network 200, 520. In another example, the bad app 704 sends another request (GET abcd.com) which is evaluated by the cloud-based security system 100, 500 (EVAL <URL, App, User>) and determines this is allowed, thereby sending the request to the Internet 101, 504, and the HTTP response is received accordingly.

Adding application-based access control to network resource access using cloud-based security systems offers several benefits. First, users can use the applications of their choice for accessing non-critical resources. The cloud-based security system 100, 500 can perform deep application identification through request body to isolate personal and corporate workspaces, thereby catering BYOD situation where an employee can access personal mail through any desired client but must use a secure mail client to access work mail. The IT admin can enforce the use of apps that conform to the security standards of the organization for accessing sensitive corporate resources. Users can get notified if the application in use is incompatible with the requested resource and if they should switch to some other application through caution/block based end user notifications. The IT admin can create real-time policies to restrict application usage for a particular network resource by whitelisting or blacklisting applications.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented by one or more nodes in a cloud-based security system, for enforcing application-based control of network resources, the method comprising:
receiving a request from a user device for the network resources, wherein the user device is connected to the cloud-based system through a tunnel such that all network traffic is forward thereto, prior to the network resources for inline monitoring;
evaluating the request through the cloud-based security system based on a tunnel protocol of the tunnel and determining an application on the user device performing the request; and
performing, at the one or more nodes in the cloud-based security system external and independent from the user device, one of
denying the request if the application is unauthorized to access the network resources,
redirecting the request to an authorized application on the user device via the tunnel protocol if the application is legitimate but unauthorized to access the network resources, wherein the redirecting has the cloud-based security system utilizes a Uniform Resource Locator (URL) command of REDIRECT to cause the user device to switch the request from the application to the authorized application, and
allowing the request if the application is authorized to access the network resources.

2. The method of claim 1, wherein the network resources are in an enterprise network, the user device is a mobile device, the mobile device is configured to communicate with the enterprise network through the cloud-based security system,
wherein the enterprise network and the mobile device are both located external to the cloud-based security system, and the enterprise network and the mobile device are both located external to one another.

3. The method of claim 1, wherein the network resources are connected to the cloud-based security system through a tunnel, and wherein the evaluating is based on a tunnel protocol used.

4. The method of claim 1, wherein the redirecting comprises
  causing the authorized application to intercept a redirect request,
  causing a tunnel between the user device and a network associated with the network resources, and
  enabling exchange of the network resources to the authorized application via the tunnel.

5. The method of claim 1, further comprising:
  receiving a list of whitelist and blacklist applications for determining the application, wherein the list is associated with the network resources.

6. The method of claim 1, further comprising:
  responsive to the denying, providing a notification to the end user through a mobile Operating System notification cloud.

7. The method of claim 1, wherein the application comprises an email client and the network resources comprise email on a corporate network.

8. The method of claim 1, wherein the application comprises a Web browser and the network resources comprise data files or content on a corporate network.

9. A node in a cloud-based security system configured to enforce application-based control of network resources, the node comprising:
  a network interface, a data store, and a processor communicatively coupled to one another; and
  memory storing computer executable instructions, and in response to execution by the processor, the computer-executable instructions cause the processor to
    receive a request from a user device for the network resources, wherein the user device is connected to the cloud-based system through a tunnel such that all network traffic is forward thereto, prior to the network resources for inline monitoring,
    evaluate the request through the cloud-based security system based on a tunnel protocol of the tunnel and determine an application on the user device performing the request, and
    perform, in the node in the cloud-based security system external and independent from the user device, one of
      deny the request if the application is unauthorized to access the network resources,
      redirect the request to an authorized application on the user device via the tunnel protocol if the application is legitimate but unauthorized to access the network resources, wherein, for the redirect, the node in the cloud-based security system utilizes a Uniform Resource Locator (URL) command of REDIRECT to cause the user device to switch the request from the application to the authorized application, and
      allow the request if the application is authorized to access the network resources.

10. The node of claim 9, wherein the network resources are in an enterprise network, the user device is a mobile device, the mobile device is configured to communicate with the enterprise network through the cloud-based security system,
  wherein the enterprise network and the mobile device are both located external to the cloud-based security system, and the enterprise network and the mobile device are both located external to one another.

11. The node of claim 9, wherein the network resources are connected to the cloud-based security system through a tunnel, and wherein the evaluating is based on a tunnel protocol used.

12. The node of claim 9, wherein, to redirect, the computer-executable instructions cause the processor to
  cause the authorized application to intercept a redirect request,
  cause a tunnel between the user device and a network associated with the network resources, and
  enable exchange of the network resources to the authorized application via the tunnel.

13. The node of claim 9, wherein the computer-executable instructions further cause the processor to
  receive a list of whitelist and blacklist applications for determining the application, wherein the list is associated with the network resources.

14. The node of claim 9, wherein the computer-executable instructions further cause the processor to
  responsive to the denying, provide a notification to the end user through a mobile Operating System notification cloud.

15. The node of claim 9, wherein the application comprises an email client and the network resources comprise email on a corporate network.

16. The node of claim 9, wherein the application comprises a Web browser and the network resources comprise data files or content on a corporate network.

17. A user device configured to access a cloud-based security system which performs application-based control of network resources, the node comprising:
  a network interface, a data store, and a processor communicatively coupled to one another; and
  memory storing computer executable instructions, and in response to execution by the processor, the computer-executable instructions cause the processor to
    provide a request the network resources through an application, wherein the user device is connected to the cloud-based system through a tunnel such that all network traffic is forward thereto, for inline monitoring,
    responsive to evaluation of the request through the cloud-based security system based on a tunnel protocol of the tunnel, perform one of
      receive a denial of the request if the application is unauthorized to access the network resources, wherein the request is denied and blocked in the cloud-based security system external and independent from the user device,
      cause redirection of the request to an authorized application by the cloud-based security system via the tunnel protocol if the application is legitimate but unauthorized to access the network resources, wherein the request redirected in the cloud-based security system external and independent from the user device such that the cloud-based security system utilizes a Uniform Resource Locator (URL) command of REDIRECT to cause the user device to switch the request from the application to the authorized application, and
      receive a response to the request if the application is authorized to access the network resources, wherein the request is allowed in the cloud-based security system external and independent from the user device.

18. The user device of claim 17, wherein the network resources are in an enterprise network, the user device is a mobile device, the mobile device is configured to communicate with the enterprise network through the cloud-based security system, wherein the enterprise network and the mobile device are both located external to the cloud-based security system, and the enterprise network and the mobile device are both located external to one another.

* * * * *